United States Patent [19]
Clark et al.

[11] Patent Number: 5,803,523
[45] Date of Patent: Sep. 8, 1998

[54] EXTENDABLE SUPPORT SYSTEM

[75] Inventors: Jeffrey L. Clark; Robert M. Beard; Lawrence E. Stoltz, all of Santa Barbara, Calif.

[73] Assignee: Gator Ramp Systems, Inc., Santa Barbara, Calif.

[21] Appl. No.: 690,362

[22] Filed: Jul. 26, 1996

[51] Int. Cl.⁶ .................................................. B62C 1/06
[52] U.S. Cl. ........................... 296/26.1; 296/61; 296/62; 296/26.09; 414/537; 14/71.1
[58] Field of Search ................ 296/57.1, 26, 61, 296/62; 14/71.1; 414/537; 312/333; 248/292.14; 280/163; 160/223, 225

[56] References Cited

U.S. PATENT DOCUMENTS

| | | | |
|---|---|---|---|
| 2,955,863 | 10/1960 | Olender | 292/264 |
| 3,570,029 | 3/1971 | Hunsaker | 9/7 |
| 3,571,836 | 3/1971 | Dunlap | 14/71 |
| 3,603,373 | 9/1971 | Haschek et al. | 160/202 |
| 3,977,545 | 8/1976 | Lloyd | 214/85 |
| 4,114,944 | 9/1978 | Joynt et al. | 296/50 |
| 4,580,828 | 4/1986 | Jones | 296/57 R |
| 4,628,561 | 12/1986 | Kushniryk | 14/69.5 |
| 4,784,429 | 11/1988 | Hodges | 296/165 |
| 4,845,792 | 7/1989 | Bakula et al. | 14/69.5 |
| 4,864,673 | 9/1989 | Adaway et al. | 14/71.1 |
| 4,900,217 | 2/1990 | Nelson | 414/537 |
| 4,923,360 | 5/1990 | Beauchemin | 414/537 |
| 4,955,358 | 9/1990 | Harris et al. | 126/25 R |
| 4,993,088 | 2/1991 | Chudik | 5/118 |
| 5,137,114 | 8/1992 | Yde et al. | 182/49 |
| 5,244,335 | 9/1993 | Johns | 414/537 |
| 5,312,148 | 5/1994 | Morgan | 296/61 |
| 5,312,149 | 5/1994 | Boone | 296/61 |
| 5,331,701 | 7/1994 | Chase et al. | 14/71.1 |
| 5,418,194 | 5/1995 | Dawes et al. | 501/52 |
| 5,536,058 | 7/1996 | Otis | 296/61 |
| 5,586,802 | 12/1996 | Dewald, Jr. et al. | 296/26 |

FOREIGN PATENT DOCUMENTS 500688  2/1939  United Kingdom ............ 160/223

*Primary Examiner*—Gary C. Hoge
*Assistant Examiner*—Jason Morrow
*Attorney, Agent, or Firm*—Fulwider, Patton, Lee & Utecht, LLP

[57] ABSTRACT

An extendable support system having a plurality of support members and a plurality of pairs of spaced-apart side rails, each pair of which being affixed to one support member. Each of the support members move longitudinally relative to the other and include stop tabs which are configured to limit the longitudinal extension of the support system. The support members are L-shaped to add strength to the system as well as limit longitudinal retraction of the system. The extendable support system is attached to a platform by means of a pair of spaced-apart T-rails and includes extension means for increasing the angle of motion of a pivotal platform.

30 Claims, 4 Drawing Sheets

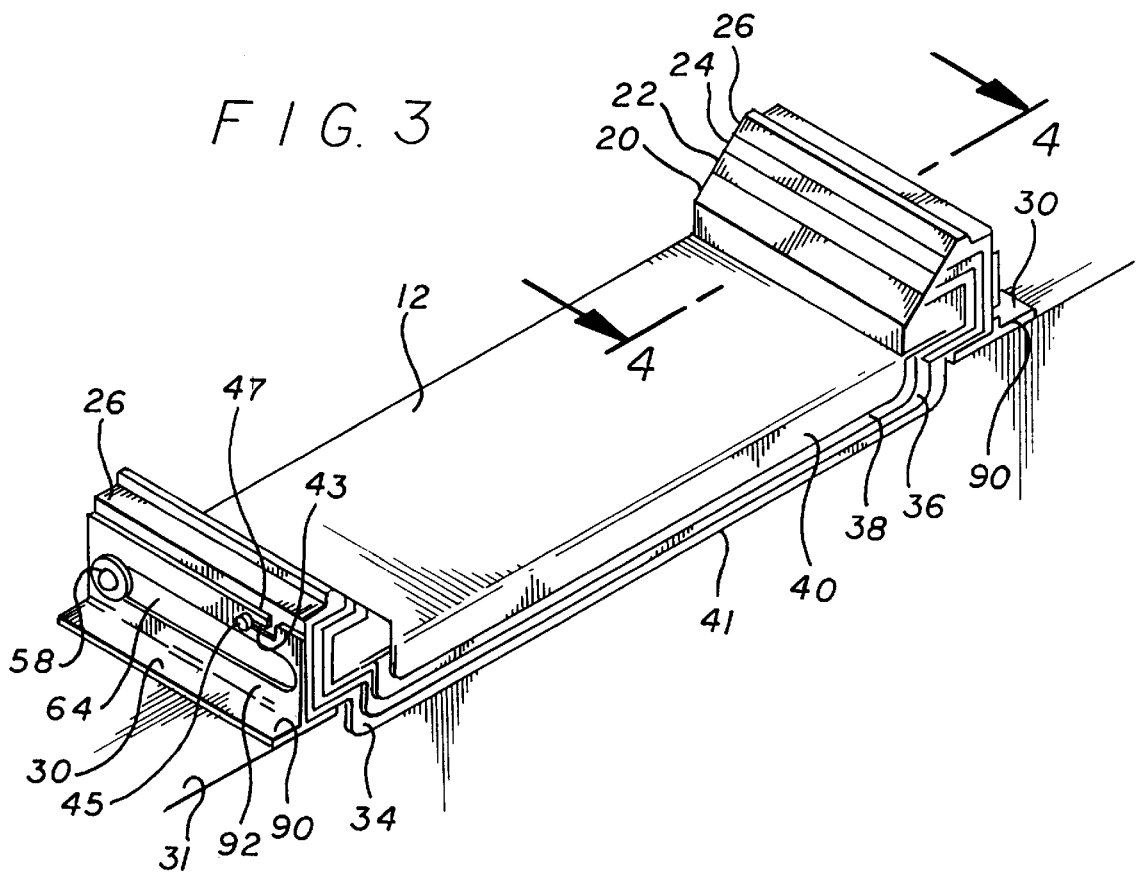
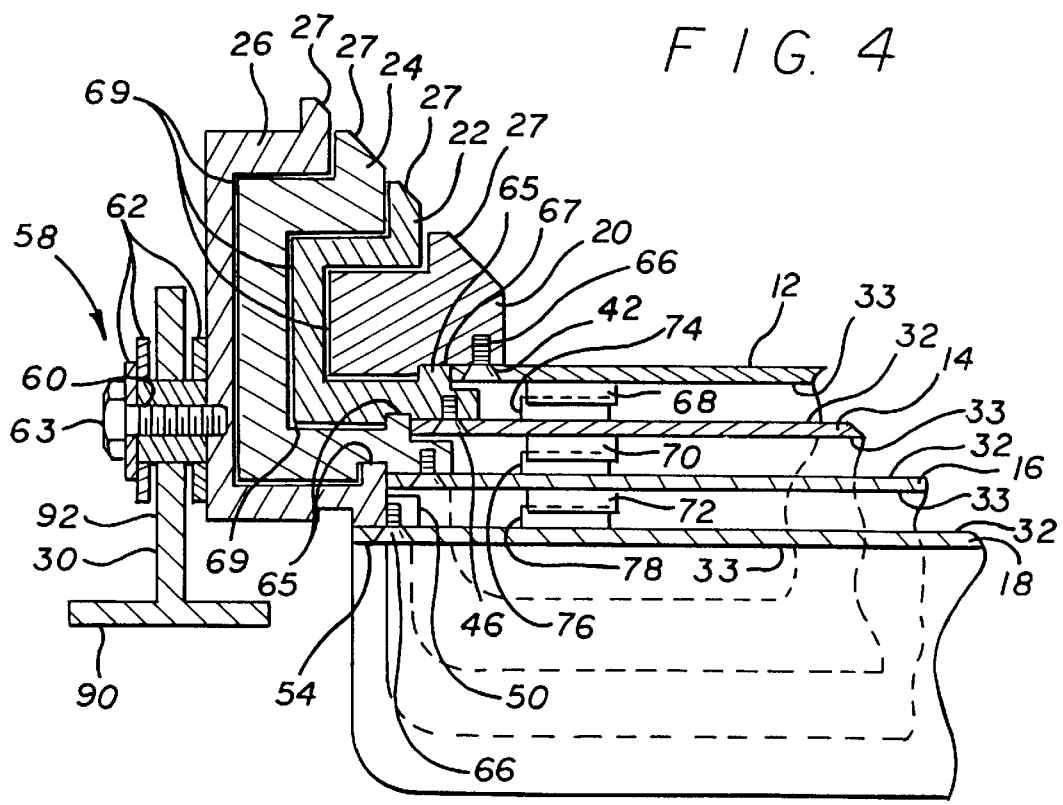

EXTENDABLE SUPPORT SYSTEM

BACKGROUND OF THE INVENTION

This invention relates to extendable support systems, and more particularly, to extendable support systems which attach to a vehicle or an elevated platform for the purpose of providing access thereto or an extended functional surface therefrom.

In many situations, it is desirable to have available an extendable support system. For instance, an extendable support system can be mounted to a vehicle or dock and extended to a lower or higher surface in order to provide a ramp to the vehicle or dock. Also, an extendable support system could be secured to any elevated structure and extended in order to provide an extended working surface.

Conventional extendable support systems have been incorporated into the tailgate structure of a vehicle for the purpose of providing a ramp to the bed of the vehicle. Certain of the conventional support systems embody a complex arrangement of folding plates which are hinged to one another and include support cables or other equivalent means which function to aid in extending the folding plates, as well as support the plates while they are in their extended configuration. Other support systems replace the tailgate of a truck and employ essentially planar plates arranged telescopically and an intricate sliding track design which includes stopping pins configured to slide within grooves and machined retaining brackets, each of which limit the telescopic movement of the plates.

The heretofore mentioned conventional support systems have a number of disadvantages. In particular, the folding plate design is relatively difficult to deploy and is not useful if partially extended since a planar surface is only provided when the system is completely extended. Moreover, due to its complex design and number of moving parts, it is relatively difficult to manufacture and subject to failure. With respect to the telescopic design, since it replaces the tailgate of a truck, it has the inherent disadvantage of needing to clear the truck bed and bumper. Additionally, the planar plates of the telescopic design lack reinforcing structure which tends to resist deflection of the plates in response to heavy loads and consequently, torquing forces are placed upon the intricate sliding tracks which can, in turn, limit their useful life.

To circumvent or overcome the problems and limitations associated with conventional extendable support systems, an extendable support system that is simple to deploy, that has enhanced reinforcing structure, and which can be functional when only partially extended can be employed. In order to avoid structural failures due to complexity of design, it would be further advantageous to have such a system embody a relatively simple design. The present invention addresses these needs.

SUMMARY OF THE INVENTION

Briefly, and in general terms, the present invention involves a new and improved extendable support system having a relatively simple design and capable of easy deployment, and, further, capable of providing sufficient support strength as well as providing a functional surface when only partially deployed.

Basically, the present invention includes a plurality of support members which are slidably interlocked to one another by side rails, which are, in turn, configured to move relative to a mount. Further, the present invention includes reinforcing structure and stop tabs, each of which are configured to limit the longitudinal travel of the support members.

More specifically, and in a presently preferred embodiment, by way of example and not necessarily by way of limitation, an extendable support system embodying the various features of the invention may include first, second, third and fourth pairs of spaced-apart side rails attached to first, second, third and fourth substantially L-shaped support members, respectively. In the preferred embodiment, the first pair of spaced-apart side rails slidably engage the second pair of spaced-apart side rails which slidably engage the third pair of spaced-apart side rails which, in turn, slidably engage the fourth pair of spaced-apart side rails. The first, second and third L-shaped support members include first, second, and third pairs of spaced-apart stop tabs, respectively, each of which are configured to engage corresponding pairs of stop tabs formed on the second, third, and fourth L-shaped support members, respectively. Each side rail of the fourth pair of spaced-apart side rails are each configured to slidably and rotatably engage one T-rail of a pair of spaced-apart T-rails. The T-rails are configured to be mounted to a vehicle or other elevated platform.

In the preferred embodiment, the stop tab system is intended to limit the longitudinal extension of the extendable support system. The bend or base of each L-shaped support member is intended to limit the longitudinal retraction of the extendable support system as well as to provide reinforcement to each individual L-shaped support member. The smooth longitudinal extension and retraction motion of the extendable support system is facilitated by bearings configured between adjacent side rails.

Moreover, in the preferred embodiment, the first L-shaped support member is narrower in width with respect to the second L-shaped support member, which is narrower in width than the third L-shaped support member which is, in turn, narrower in width to the fourth L-shaped support member. In an alternative embodiment, rather than increasing in width, each successive L-shaped support member decreases in overall width. In other alternative embodiments, the extendable support system can include retractable legs which further supports the system as well as be configured to be integral to the vehicle or other elevated platform.

The present invention also includes a pair of extenders which function to increase the angle of motion of a tailgate or other pivotable elevated platform to which the extendable ramp system is mounted. Further, it is contemplated that the working surface of the L-shaped support members be powder coated with a silicone carbide or aluminum oxide composite, or other equivalent substrate, in order to provide the extendable support system with a gripable surface.

Other features and advantages of the present invention will become apparent from the following detailed description, taken in conjunction with the accompanying drawings, which illustrate, by way of example, the principles of the invention.

DESCRIPTION OF THE DRAWINGS

FIG. 3 is a perspective view of the extendable support system depicted in FIGS. 1 and 2, showing the support system fully retracted.

FIG. 4 is a partial cross-sectional view taken along line 4—4 of FIG. 3, showing the spacial interrelationships of the side rails, T-rails, and stop tabs.

DETAILED DESCRIPTION OF THE PREFERRED EMBODIMENTS

Figure 1:
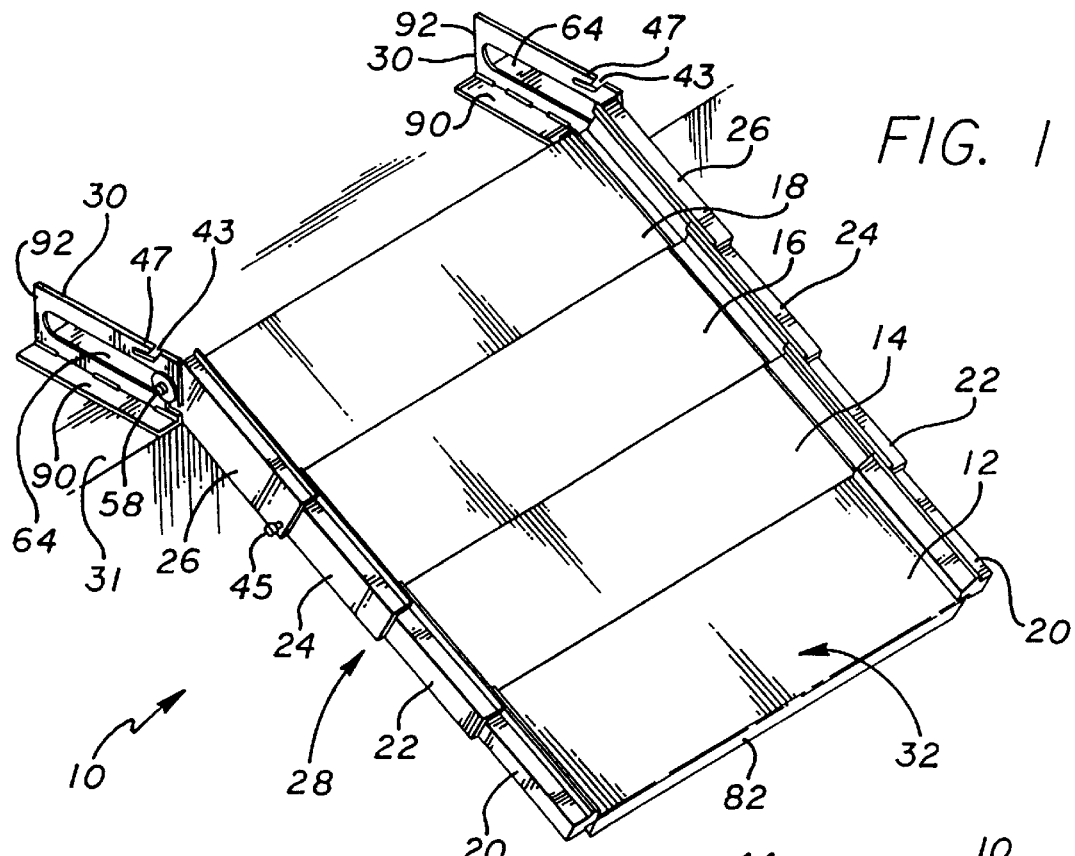
FIG. 1 is a perspective view of a top side of the extendable support system, showing the support system fully extended.

Referring now to the drawings, and particularly FIG. 1 thereof, there is shown a generalized system for one embodiment of an extendable support system 10 incorporating the novel features of the present invention. It is contemplated that the present invention can be adapted to provide access to a vehicle or platform or to provide an extended working space therefrom, in either its fully extended or partially extended configuration. The extendable support system includes a plurality of substantially planar and rectangular support members 12, 14, 16, 18, each of which are respectively attached to a pair of spaced-apart side rails 20, 22, 24, 26 and each of which moves longitudinally relative to the other. Further, the support member and side rail assembly 28 rotatably and slidably engages a pair of spaced-apart T-rails 30. The T-rails are mounted to the vehicle or platform 31. An upperside 32 of the extendable support system 10 provides a relatively planar surface across which an object can be transported in order to reach the vehicle or platform, or in the alternative, provides an extended work space from the vehicle or platform.

Figure 2:
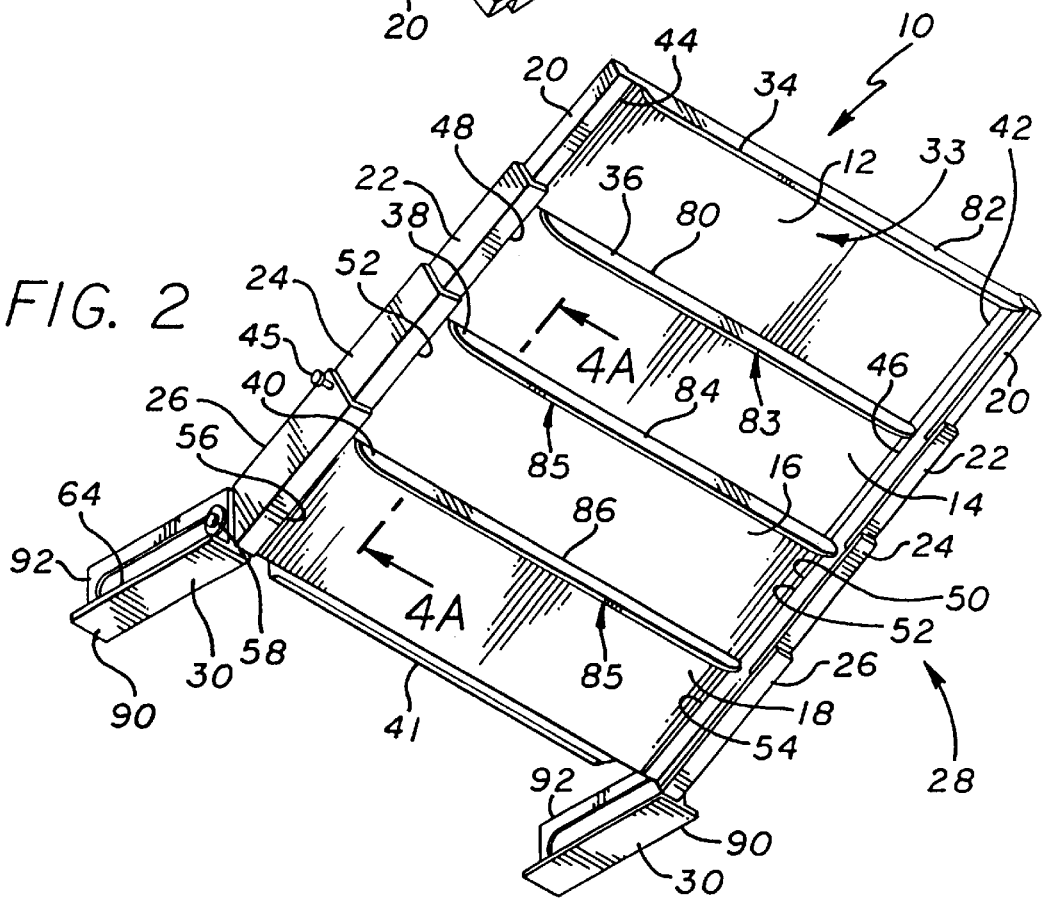
FIG. 2 is a perspective view of an underside of the extendable support system, showing the support system fully extended.

Referring now to FIG. 2, the underside 33 of the extendable support system includes four reinforcing members 34, 36, 38, 40, which are provided by bends formed in the support members 12, 14, 16, 18, respectively. That is, the support members embody a substantially L-shape, the bend or base of which provides additional reinforcing structural support to each individual support member and increases the overall strength of the extendable support system 10. Significantly, the bends provide increased rigidity and therefore, help to resist a deflection in the support members caused by significant forces. In this way, not only can a greater load be supported without deflection but the life of the extendable support system can be enhanced because less torque is placed at the interface between the side rails. Moreover, the L-shaped configuration provides enhanced strength without adding a significant amount of material. The extendable support systems, therefore, can be relatively lightweight and can comprise relative inexpensive materials. Also, the fourth support member 18 includes a supplemental bend 41 which can either be substantially parallel to or at an angle respective to the other bends. The supplemental bend provides reinforcing support and an engagement means at the junction between the support member and side rail assembly 28 and adjacent structure, such as the vehicle or platform 31.

As shown in FIG. 3, the bends 34, 36, 38, 40 also provide means for limiting the longitudinal retraction of one L-shaped supporting member 12, 14, 16, 18, beyond another L-shaped support member 12, 14, 16, 18. The support members are sized so that they neatly stack adjacent each other when the extendable support system 10 is in its retracted configuration. Additionally, as best seen in FIG. 3, the first reinforcing member or bend 34 includes a rubber foot 41 which is designed for frictional engagement with a surface when the extendable support system is expanded and used as a ramp.

Further, as is best seen in FIG. 3, the T-rail 30 has a J-slot 43 formed therein which is configured to receive a guide pin 45. It is preferred that such structure be incorporated into each T-rail (see FIG. 1). The J-slot/guide pin system functions to fix the outer side rails during transport or provide means for converting the support member and side rail assembly into a cantilevered table mode. The T-rail can be further configured with a hole 47 through which a conventional lock pin (not shown) can be inserted to lock the extendable support system 10 in its retracted state by way of its engagement with the guide pin.

Figure 4A:
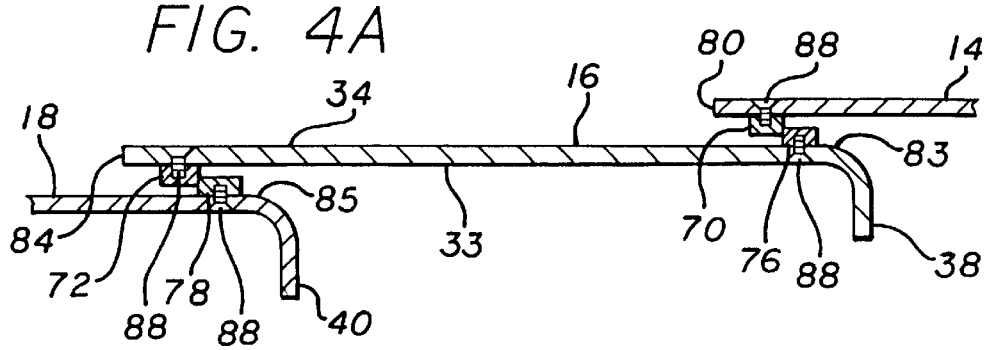
FIG. 4A is a cross-sectional view taken along line 4A—4A of FIG. 2, showing engagement of the stop tabs.

Referring now to FIGS. 2 and 4, in the preferred embodiment, the extendable support system includes a first substantially L-shaped support member 12, each end 42, 44 of which is secured to one side rail of a first pair of spaced-apart side rails 20. Each of the first pair of side rails 20 individually slidably engage one side rail of a second pair of spaced-apart side rails 22. The second pair of spaced-apart side rails are individually attached to the ends 46, 48 of a second substantially L-shaped support member 14. In turn, each of the second pair of side rails 22 individually slidably engage one side rail of a third pair of spaced-apart side rails 24, which are individually attached to the ends 50, 52 of a third substantially L-shaped support member 16. Significantly, each of the third pair of side rails 24 individually slidably engage one side rail of a fourth pair of spaced-apart side rails 26, which are individually attached to the ends 54, 56 of a fourth substantially L-shaped support member 18. It is to be appreciated that although in the preferred embodiment, the support member and side rail assembly 28 includes four sliding components, it is contemplated that fewer or more components of varying lengths can be used for any particular application.

Each of the fourth pair of spaced-apart side rails are mounted to one T-rail of the pair of spaced-apart T-rails 30 by way of a bearing/pin assembly 58 which includes a rolling bearing or replaceable self-lubricating wear pin 60, and washers 62. The assembly can be affixed to the fourth side rail by a threaded bolt 63 or other equivalent mounting means. The rolling bearings or wear pins 60 are configured to longitudinally travel within a slot 64 formed in the T-rails. The washers aid in capturing the bearing or pin within the slot formed in the T-rails and are contemplated to comprise an anti-friction material for the purpose of facilitating travel along the T-rails.

Additionally, in the preferred embodiment, the second, third and fourth pairs of side rails 22, 24, 26 have a generally C-shaped cross-sectional profile of increasing size. The first pair of side rails 20 has more of a rectangular cross-sectional profile. In this way, adjacent side rails can interlock to each other. Also, the second, third and fourth side rails include a vertical, rectangular in cross-section, projection 65 which is configured to mate with a corresponding recess 67 in adjacent side rails. The vertical projection facilitates load dispersion as well as helps to keep the side rails from moving inwardly, or toward their corresponding pairs, in response to a load. As can also be seen in FIG. 4, the L-shaped support members 12, 14, 16, 18 are mounted to the side rails 20, 22, 24, 26, by way of fasteners 66. It is to be understood, however, that any equivalent means can be used to attach the support members to the side rails.

Each of the side rails 20, 22, 24, 26 are further configured with inwardly directed chamfers 27. The chamfers and overall design of the side rails provide the extendable support system 10 with a guiding or retaining means for items transported across or placed thereupon, as well as a surface well suited for withstanding loads directly applied thereto.

Interspersed between adjacent side rails are bearing surfaces 69 which aid in providing the extendable support system 10 with a smooth sliding motion. In the preferred embodiment, the bearings embody sheets of brass or other self-lubricating material such as teflon, delrin, nylon or lubron, upon which adjacent side rails move in a longitudinal manner. The bearings may be affixed to either of the adjacent side rails, or in the alternative, a bearing may be affixed to each of the adjacent side rails. By comprising brass or an equivalent material, the bearings are expected to have a long life.

Further, as is shown in FIG. 4, the extendable support system 10 embodies a plurality of pairs of stop tabs 68, 70, 72, 74, 76, 78. A first pair of spaced-apart stop tabs 68 extend from the underside 33 of the first L-shaped support member 14 and near a distal end 80 (see FIG. 2) of the first support member with respect to the beginning 82 of the extendable support system. Likewise, the second L-shaped support member 16 has a second pair of spaced-apart stop tabs 70 extending from its underside 33 and near a distal end 84, relative to the beginning 82 of the extendable support system, of the second support member. Similarly, the third L-shaped support member 18 has a third pair of spaced-apart stop tabs 72 extending from its underside 33 and near its distal end 86.

Each of the pairs of stop tabs 68, 70, 72 are configured to engage corresponding pairs of spaced-apart stop tabs 74, 76, 78 which project from the upperside 32 of the second, third and fourth support members 16, 18, 20, respectively, and which are positioned near the proximal (relative to beginning 82, see FIG. 2) ends 83, 85, 87 thereof. That is, the fourth pair of spaced-apart stop tabs 74, each project from the upperside of the second support member 14 and each individually engage one stop tab of the first pair of spaced-apart stop tabs 68; the fifth pair of spaced-apart stop tabs 76 project from the upperside of the third support member 16 and each individually engage one stop tab of the second pair of spaced-apart stop tabs 70; and the sixth pair of stop tabs 78 project from the upperside of the fourth support member 20, each of which individually engage one stop tab of the third pair of spaced-apart stop tabs 72.

In the preferred embodiment, stop tabs 68, 70, 72, 74, 76, 78 are attached to the L-shaped support members 14, 16, 18, 20 by means of fasteners 88. It is to be understood, however, that any equivalent securing means can be used to attach the tabs to the support members.

Figure 5:
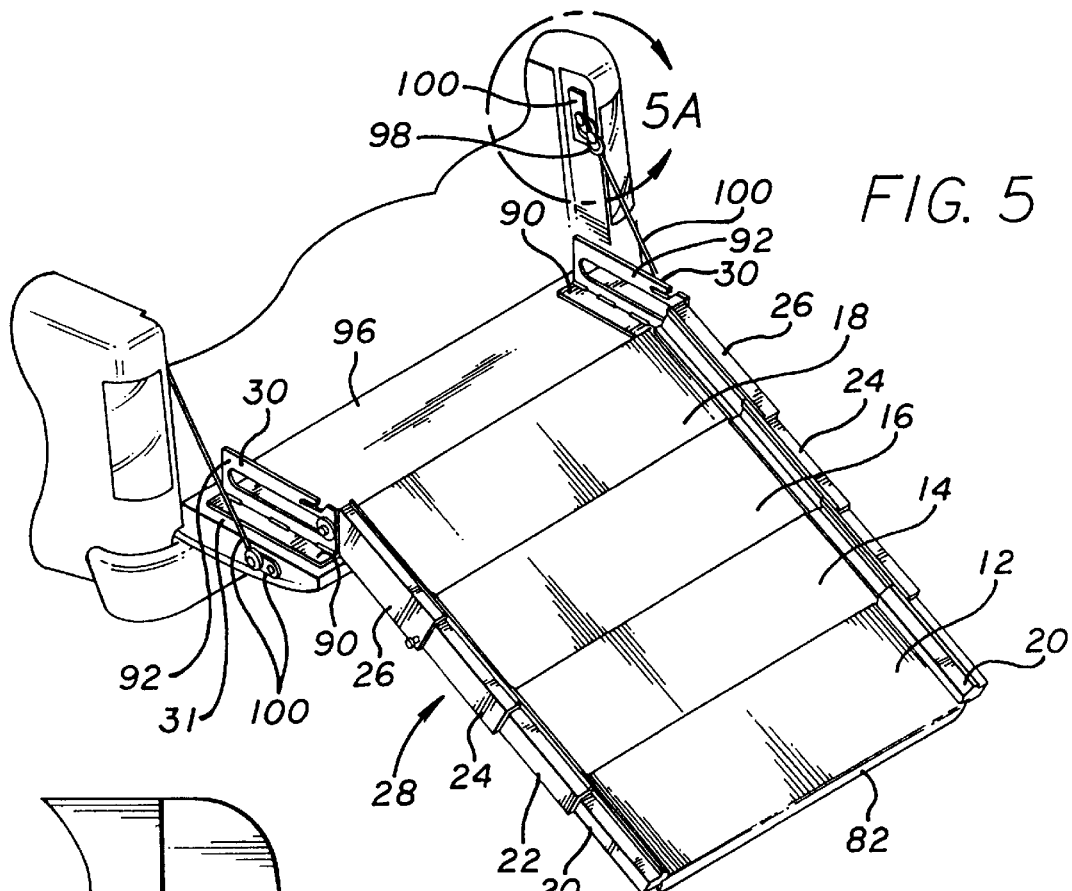
FIG. 5 is a perspective view of the extendable support system attached to a vehicle, showing the support system fully extended and depicting its cooperation with the extension means.
Figure 5A:
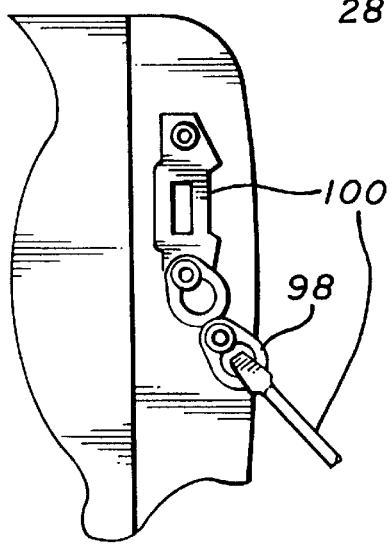
FIG. 5A is an enlarged perspective view of a portion of FIG. 5, illustrating the extension means of the system.

The T-rails 30 are best seen in FIG. 5 with reference to FIG. 4. The T-rails include a base 90 and a vertical projection 92. Formed within substantially the length of the vertical projection is the slot 64. The bearing/pin assembly 58 cooperates with the slot to enable the fourth support member 18 and fourth pair of side rails 26 to slide longitudinally along, as well as to rotate with respect to the T-rails. Since the support member and side rail assembly 21 can rotate with respect to the T-rails, the system 10 can be extended to a lower surface or bridged to a higher surface. The T-rails 30 can be welded or otherwise directly tacked to an elevated platform 31. In a preferred embodiment, however, the extendable support system 10 includes a traction base plate 96 which is fixed to the vehicle or platform. In such a system, the T-rails are welded or otherwise tacked to the traction base plate. In this way, T-rail spacing can be set prior to installing the system on a vehicle or platform.

Where the platform is a tailgate or other rotating member, an extension means 98 is added to structure 100 which supports the platform (see FIG. 5A). In the preferred embodiment, the extension means is a double-eyed link. The purpose of the extension means is to angle the platform so that the extendable support system 10 provides a more gradual angle to the platform when it is being used as a ramp. Where the extendable support system is being used as a working surface, the extension can be removed so that the extendable support system makes a right angle from the platform.

Figure 6:
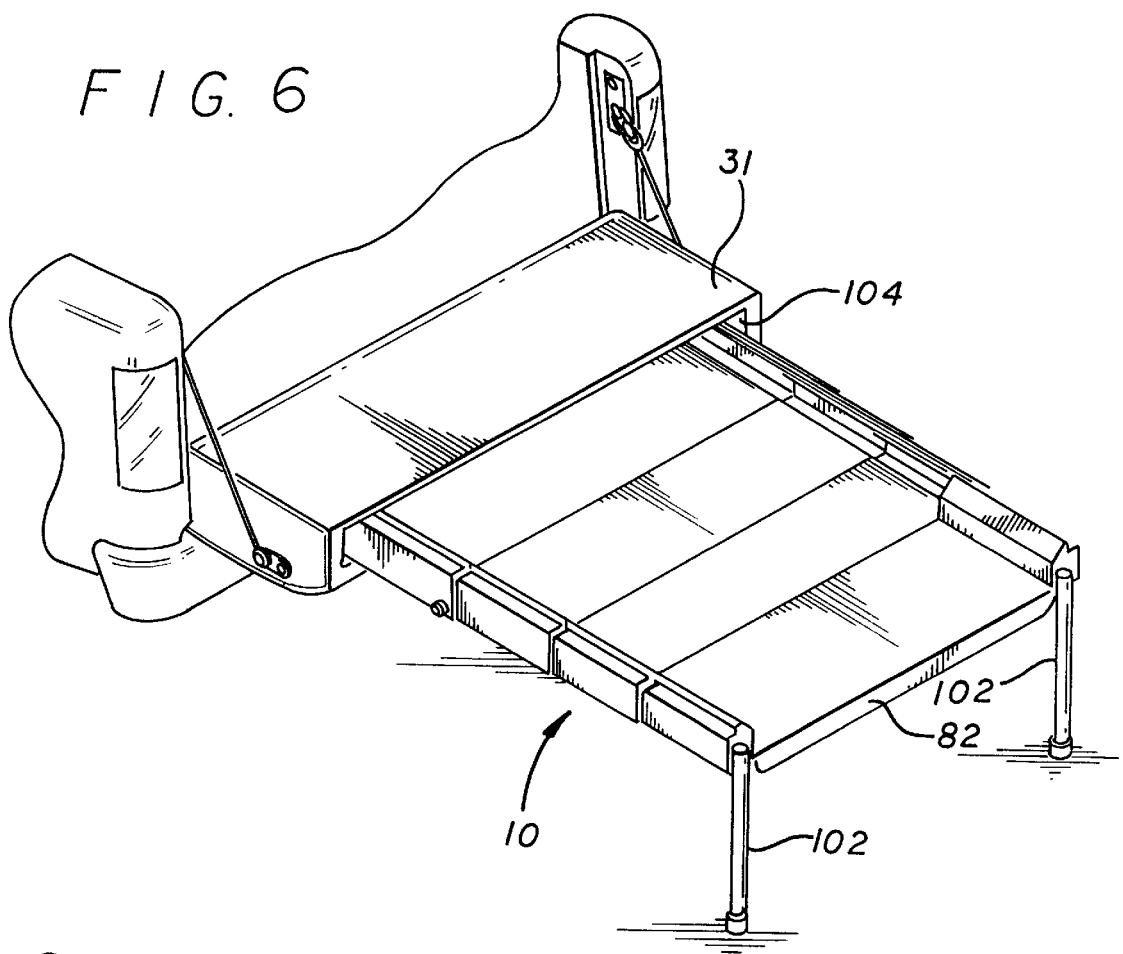
FIG. 6 is a perspective view of an alternative embodiment of the present invention, showing the alternative support system fully extended and with legs extended.

As shown in FIG. 6, in an alternative embodiment, retractable legs 102 of any conventional design can be added to the beginning 82 of the extendable support system 10 to provide additional load support capability for the working surface. Alternatively, the extendable support system can be extended only partially so that the system supports itself by means of the side rails and locking pins in the J-slot. Moreover, it is contemplated that in an alternative embodiment, the extendable support system is integral with the tailgate of a vehicle or other platform. For instance, the support system can be configured such that in its fully retracted state, it is confined within an interior of a tailgate and when extended, it projects out through an opening 104 formed in the tailgate.

Figure 7:
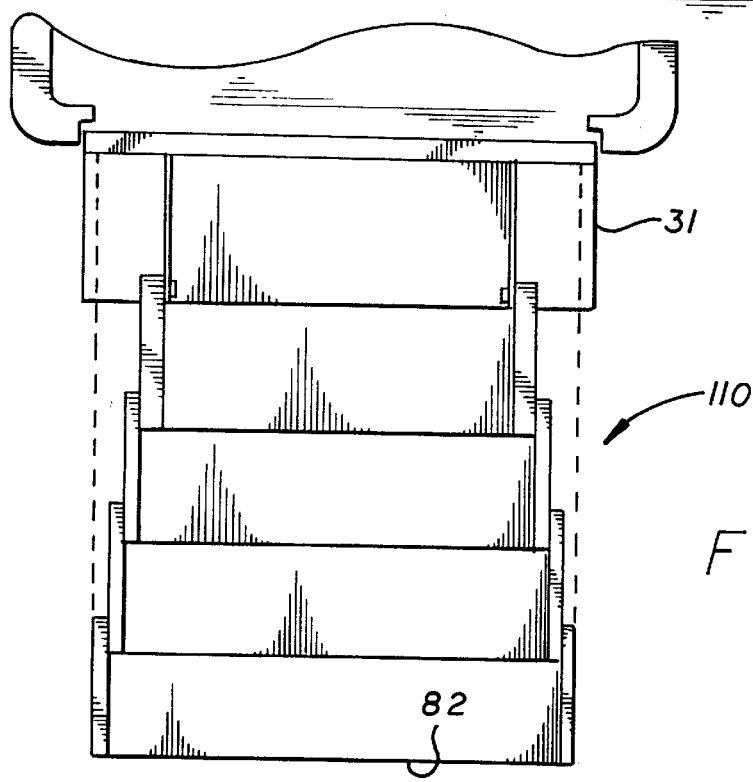
FIG. 7 is a perspective view of another alternative embodiment of the present invention, showing the alternative support system fully extended.

Referring now to FIGS. 1 and 2, it can be seen that the width of the first L-shaped support member 12 is less than that of the second L-shaped support member 14, which has a width less than that of the third L-shaped support member 16, which, in turn, has a width less than that of a fourth L-shaped support member 18. In an alternative embodiment 110 (FIG. 7), the first L-shaped support member 112 can be the greatest in width and the width of each successive L-shaped support members 114, 116, 118 can decrease in magnitude. In this way, a wider ingress onto the extendable support system 110 is provided.

Although the extendable support system 10, 110 can be provided with many surfaces, it has been found that a powder or grit coated finish provides a desirable surface. In the preferred embodiment, it is contemplated that a silicone carbide or aluminum oxide composition powder grit be used to coat the upperside 32 of the extendable support system.

Moreover, handles 120 can be affixed to the upperside 32 and underside 33 of the extendable support system 10. The handles provide gripping means so that the support systems can be expanded and retracted in a controlled fashion.

Additionally, it is contemplated that the extendable support system 10, 110 can be configured with conventional locking means which can be used to either lock the system in a fully or partially extended configuration. This feature is particularly desirable where the system is used as a horizontal working space or when used as a ramp, where the lower surface is unstable.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. An extendable support system, comprising:

a plurality of support members, each said support member configured to move longitudinally and including a reinforcing member which provides said support members with a substantially L-shaped configuration, said reinforcing member extending substantially the width of each said support member and operating to limit longitudinal retraction of the extendable support system;

a plurality of stop tabs configured to limit longitudinal extension of the support system; and a plurality of pairs of spaced-apart side rails, each pair of side rails being affixed to one support member and being arranged adjacent another pair of side rails;

wherein at least one said stop tab extending from an underside of one said support member, and at least one said stop tab extending from an upperside of an adjacent support member, said stop tabs configured to engage one another to limit the longitudinal extension of said extendable support system.

2. The system of claim 1, further comprising a pair of spaced-apart T-rails, said at least one side rail slidably and rotatably engaging said T-rail, said T-rail being mounted to a platform.

3. The system of claim 2, the platform being capable of rotating about an axis and the system further comprising extension means for increasing an angle of rotation of the platform.

4. The system of claim 3, wherein said extension means is a double-eyed link.

5. The system of claim 1, wherein each said support member has a width unique from each other said support member.

6. The system of claim 5, wherein a first support member is connected to at least one said T-rail and said width of an adjacent support member is less than said first support member.

7. The system of claim 1, wherein said extendable support system mounts to a tailgate of a vehicle.

8. The system of claim 1, wherein each said support member has an upperside and an underside, said upperside having a powder coated finish.

9. The system of claim 8, wherein said powder coating includes silicone carbide.

10. The system of claim 8, wherein said powder coating includes aluminum oxide.

11. The system of claim 1, further comprising at least one bearing configured between adjacent side rails.

12. The system of claim 3, wherein each said T-rail has a J-slot formed therein and one said support member includes a guide pin, said J-slot configured to receive said guide pin.

13. The system of claim 2, further comprising a traction base plate, at least one said T-rail being attached to said traction base plate.

14. The system of claim 1, further comprising retractable legs for further supporting the system.

15. An extendable support system, comprising:

a plurality of support members, each said support member configured to move longitudinally and including a bend which provides said support members with a substantially L-shaped configuration, said bend operating to limit longitudinal retraction of the extendable support system; and a plurality of stop tabs configured to limit longitudinal extension of the support system;

wherein at least one said stop extending from an underside of one said support member, and at least one said stop tab extending from an upper side of an adjacent support member, said stop tabs configured to engage one another to limit the longitudinal extension of said extendable support system.

16. The system of claim 15, further comprising a plurality of pairs of spaced-apart side rails, each pair of side rails being affixed to one support member and being arranged adjacent another pair of side rails.

17. The system of claim 15, further comprising a pair of spaced-apart T-rails, said at least one said side rail slidably and rotatably engaging said T-rail, said T-rail being mounted to a platform.

18. The system of claim 17, the platform being capable of rotating about an axis and the system further comprising extension means for increasing an angle of rotation of the platform.

19. The system of claim 18, wherein said extension means is a double-eyed link.

20. The system of claim 15, wherein each said support member has a width unique from each other said support member.

21. The system of claim 20, wherein a first support member is connected to at least one T-rail and said width of an adjacent support member is less than said first support member.

22. The system of claim 15, wherein said extendable support system mounts to a tailgate of a vehicle.

23. The system of claim 15, wherein each said support member has an upperside and an underside, said upperside having a powder coated finish.

24. The system of claim 15, wherein said powder coating includes silicone carbide.

25. The system of claim 24, wherein said powder coating includes aluminum oxide.

26. The system of claim 15, further comprising at least one bearing configured between adjacent side rails.

27. The system of claim 17, wherein each said T-rail has a J-slot formed therein and one said support member includes a guide pin, said J-slot configured to receive said guide pin.

28. The system of claim 17, further comprising a traction base plate, at least one said T-rail being attached to said traction base plate.

29. The system of claim 15, further comprising retractable legs for further supporting the system.

30. The system of claim 15, wherein said bend extends substantially the width of each said support member and provides each said support member with structural reinforcement.

\* \* \* \* \*

UNITED STATES PATENT AND TRADEMARK OFFICE
CERTIFICATE OF CORRECTION

PATENT NO. : 5,803,523
DATED : Sep. 8, 1998
INVENTOR(S) : Jeffrey L. Clark, Robert M. Beard, Lawrence E. Stoltz It is certified that error appears in the above-identified patent and that said Letters Patent is hereby corrected as shown below:

In the drawings:
Sheet 3 of 4, FIG. 4A, change "88", to read --66--.

Column 8, claim 24, line 41, change "15", to read --23--.

Signed and Sealed this

Fifteenth Day of December, 1998

Attest:

BRUCE LEHMAN

Attesting Officer

Commissioner of Patents and Trademarks